US008321935B1

(12) United States Patent
Chen et al.

(10) Patent No.: US 8,321,935 B1
(45) Date of Patent: Nov. 27, 2012

(54) IDENTIFYING ORIGINATORS OF MALWARE

(75) Inventors: Joseph H. Chen, Los Angeles, CA (US); Christopher Peterson, Culver City, CA (US); Robert Conrad, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 908 days.

(21) Appl. No.: 12/393,957

(22) Filed: Feb. 26, 2009

(51) Int. Cl.
*G06F 11/00* (2006.01)
*G06F 12/14* (2006.01)
*G06F 12/16* (2006.01)
*G08B 23/00* (2006.01)

(52) U.S. Cl. .......................................... 726/22; 726/23
(58) Field of Classification Search .................. 726/22, 726/23
See application file for complete search history.

(56) References Cited

U.S. PATENT DOCUMENTS

2006/0236392 A1* 10/2006 Thomas et al. ............... 726/23
2007/0101430 A1* 5/2007 Raikar .......................... 726/24

* cited by examiner

*Primary Examiner* — Kambiz Zand
*Assistant Examiner* — Benjamin Kaplan
(74) *Attorney, Agent, or Firm* — Brill Law Office; Jeffrey Brill

(57) ABSTRACT

A malware analysis component receives information concerning malware infections on a large plurality of client computers, as detected by an anti-malware product or submitted directly by users. The malware analysis component analyzes this wide array of information, and identifies suspicious malware detection and submission activity associated with specific sources. Where identified suspicious patterns of malware detection and submission activity associated with a specific source meet a given threshold over time, the malware analysis component determines that the source is an originator of malware.

20 Claims, 2 Drawing Sheets

IDENTIFYING ORIGINATORS OF MALWARE

TECHNICAL FIELD

This invention pertains generally to computer security, and more specifically to identifying originators of malware.

BACKGROUND

Malware, such as computer viruses, worms and Trojan horses, is a serious threat to both business and personal computing. Various software vendors provide anti-malware products, which can detect, block and/or remove malware on a user's computer. Anti-malware products use various techniques to protect users from malware, such as, but not limited to, intrusion prevention, web browser defense, signature based detection, heuristic based detection and behavior based detection. When an anti-malware product detects a specific instantiation of malware, the anti-malware product can make a copy of the detected malware and analyze it, to learn more about both how it works and how to identify and disarm similar threats in the future. Additionally, users sometimes proactively submit suspect files to anti-malware vendors (e.g., over the Internet) to have them checked for malware.

Malicious parties that write malware have taken to testing new malware against commercial anti-malware products with large foot prints in the security market. This way, before releasing a new malware variant, the originator of the malware can determine whether a given, well established commercial anti-malware product can detect it. If the new malware can be detected, the malware originator often continues to modify it until it cannot be detected, before releasing it. Malware originators test their new malware against commercial anti-malware products either by directly submitting an infected file to a vendor for testing, or by running the anti-malware product on a hard disk or the like containing an infected file. There is currently no way for vendors of anti-malware products to identify these individuals, or to stop them from engaging in this type of behavior. It would be desirable to address these issues.

SUMMARY

A malware analysis component receives information concerning malware infections on a large plurality of client computers, as detected by an anti-malware product or submitted directly by users. The malware analysis component analyzes this wide array of information, and identifies suspicious malware detection and submission activity associated with specific sources. Where identified suspicious patterns of malware detection and submission activity associated with a specific source meet a given threshold over time, the malware analysis component determines that the source is an originator of malware.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
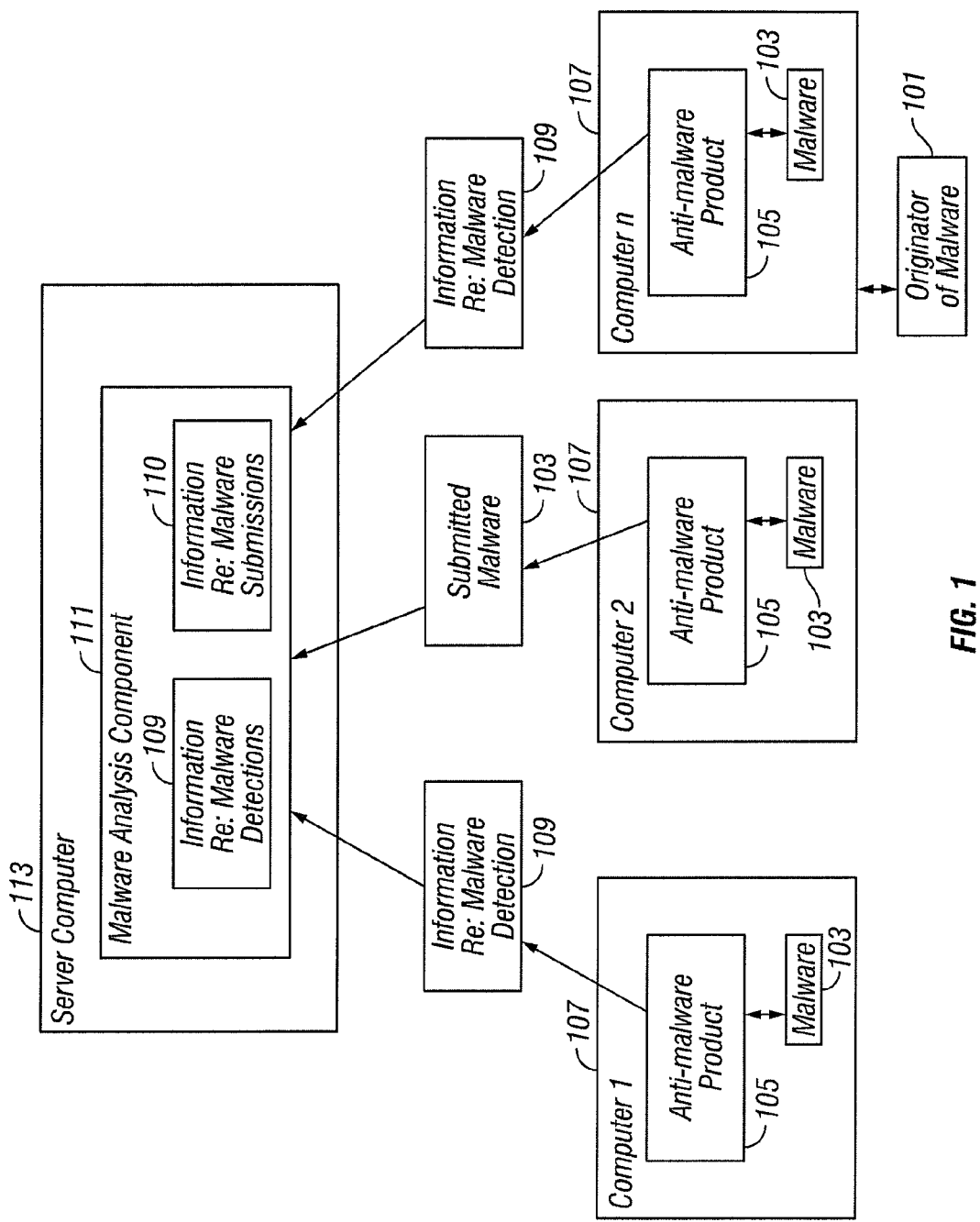
FIG. 1 is a block diagram illustrating a system for identifying originators of malware, according to some embodiments of the present invention.

FIG. 1 illustrates a system for identifying originators 101 of malware 103, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, an anti-malware product 105 is installed on the computers 107 of multiple users, and checks for and detects malware 103 thereon. The anti-malware product 105 can be instantiated in any known form or combinations of forms, such as, but not limited to an intrusion prevention system, a web browser defense system and/or a signature, heuristic and/or behavior based detection system. A user computer 107 can comprise any computing device operated by a user in a business or personal context. In FIG. 1, the anti-malware product 105 is illustrated as being installed on the user computers 107 themselves, but it is to be understood that an anti-malware product 105 and/or components thereof can also be installed on a server, a proxy or other computing devices depending upon the specific installation scenario. Also, only three user computers 107 running the anti-malware product 105 are shown for the sake of illustration, but in practice typically many orders of magnitude more would be deployed.

When the anti-malware product 105 detects malware 103 installed on a user's computer 107, the anti-malware product 105 sends information 109 concerning the detection of the malware 103 to a malware analysis component 111 for subsequent analysis. The malware analysis component 111 is located at a central location, for example a server computer 113 as illustrated. The information 109 that is sent to the malware analysis component 111 concerning the malware 103 detection can, but need not, include an actual copy of the malware 103 itself. An identification of the infected computer 107 and the date and time the infection was detected are also typically included in the information 109 (or determined by the malware analysis component 111). Additionally, users that suspect a given file 113 is infected with or comprises malware 103 submit suspect files 113 to the malware analysis component 111 to be checked for malware 103. Upon receipt, the malware analysis component 111 can note information 110 concerning the submission, such as the date, time, source and content. When the malware analysis component 111 determines that a given submitted suspect file 113 is infected with or comprises malware 103, the malware analysis component 111 can analyze that detected malware 103, as well as the corresponding submission information 110.

By receiving submissions and making detections of malware 103 from a wide variety of user's computers 107, the malware analysis component 111 has access to a wide array of information 109/110 concerning malware 103 infections as they occur in the field. As illustrated in FIG. 1, this information 109/110 is leveraged to identify suspected originators 101 of malware 103 (e.g., individuals or organizations likely to be writing and distributing malware 103, computers 107 from which such distribution is likely to be occurring, etc.). As explained in more detail below, specific patterns of detection or submission of malware 103 are interpreted to indicate a likelihood that the infected/submitting party is an originator 101 of malware 103.

The malware analysis component 111 analyzes information 109/110 concerning detected and submitted malware 103, and identifies suspicious activity. For example, upon receiving information 109/110 concerning detection or submission of malware 103, the malware analysis component 111 can determine whether this particular malware 103 is already known. Because the malware analysis component 111 receives information 109/110 concerning a wide variety of malware 103 from the numerous computers 107 running the anti-malware product 103, the malware analysis component 111 often has already analyzed a particular piece of submitted/detected malware 103, and thus is able to detect that the malware 103 is already known. Additionally (or instead), the malware analysis component 111 can refer to one or more proprietary and/or public databases of known malware 103 to determine whether a specific piece of submitted/detected malware 103 is new. Where the particular malware 103 is not being seen for the first time, these techniques can also be used to determine for how long the malware 103 has been in circulation, based on the dates/times of first known occurrence recorded by the malware analysis component 111 and/or in the database(s).

Initial detection or submission of a new piece of malware 103 is an indication that the originator 101 might be testing that malware 103 against the anti-malware product 103, as that malware 103 is not known to be in circulation already. Where the malware 103 has already been seen, the later it is in the life cycle of that malware 103, the less likely it is that the malware 101 is coming from its originator 101. In other words, even if the particular malware 103 has been seen once or twice before within a very recent time frame (e.g., minutes, hours or even days), it is possible that the originator 101 of the malware 103 is still testing it for possible detectability. However, if a detected infection involves malware 103 that is well known and has been in circulation for months, is not likely that the detection is associated with the originator 101 of that malware 103.

How suspicious specific characteristics and actions are considered to be is a variable design parameter. For example, in one embodiment, proactively submitting a new piece of malware 103 is considered more suspicious than having one detected by the routine action of the anti-malware product 103, although in another embodiments no distinction is made between these events. The length of time in which a particular piece of malware 103 need be in circulation before its submission/detection is longer considered suspicious can be adjusted up and down in different embodiments, and based on other factors such as the type of malware (e.g., virus versus worm), the potential threat level of the malware 103, etc. A single instance of a user submitting a new piece of malware 103 is typically considered only somewhat suspicious, but if the same user continues to submit multiple pieces of new malware 103 over time, that would likely be considered very suspicious.

Another factor that the malware analysis component 111 can interpret as an indication that an originator 101 is testing a piece of malware 103 is multiple submissions/detections of separate instances of malware 103 with different hash values, each instance having a single malicious signature. In other words, where variations of a single piece of malware 103 are being submitted/detected by/on a single source, it is an indication that the source comprises an originator 101 who is tweaking malware 103 to evade detection. Variations on a single piece of malware 103 can be identified where the corresponding hash values vary between submissions/detections, but the underlying signature identifying the malware 103 is the same for each submissions/detection. An example of this would be the case in which multiple submissions/detections have different MD5 hash values, MD5 being a cryptographic hash function often used by anti-malware products 103, but the same underlying malware 103 signature. (A cryptographic hash function is a deterministic procedure that takes a block of data and returns a fixed-size bit string, the hash value, such that an accidental or intentional change to the data will almost certainly change the hash value.) Note that polymorphic viruses work by frequently changing their image to prevent detection of their malicious payload, so the above described identification of varying hash values and a constant signature does not indicate a likelihood of an originator 101 of malware 103 in the case of known or identified polymorphic malware 103.

In its identification of factors indicating a likelihood that a party is an originator 101 of malware 103, the malware analysis component 111 can associate each detection and submission source (e.g., user computer 107, specific user of a given computer 107, etc.) with an identifier, such as a global unique identifier (GUID). For each submission or detection of malware 103, the malware analysis component 111 can determine a suspiciousness level, based on factors such as those described above. The malware analysis component 111 also maintains an ongoing suspiciousness level for each detection/submission source (identified, for example, by GUID), based on the history of detections/submissions from that source. What suspiciousness level to assign based on various given suspicious detections/submissions is a variable design parameter, as is ongoing suspiciousness level calculation based on multiple suspicious events. When the ongoing suspiciousness level for a detection/submission source reaches a given threshold, the malware analysis component 111 determines that the given detection/submission source is a malware originator 101. What threshold to use in making such determinations is another variable design parameter, which can vary between embodiments as desired.

Once the malware analysis component 111 determines that a given detection/submission source is a malware originator 101, the malware analysis component 111 can take any appropriate action as desired. For example, the malware analysis component 111 can monitor activity performed by the party determined to be a malware originator 101, and, e.g., perform a more detailed analysis of all new binary files detected on that source. The malware analysis component 111 could instead automatically flag all new binary files detected on that source as being malware 103, and, e.g., protect other computers 107 from that malware 103. Another possibility is for the malware analysis component 111 to report these detected images (and/or the malware originator 101) to a central security server or the like.

Figure 2:
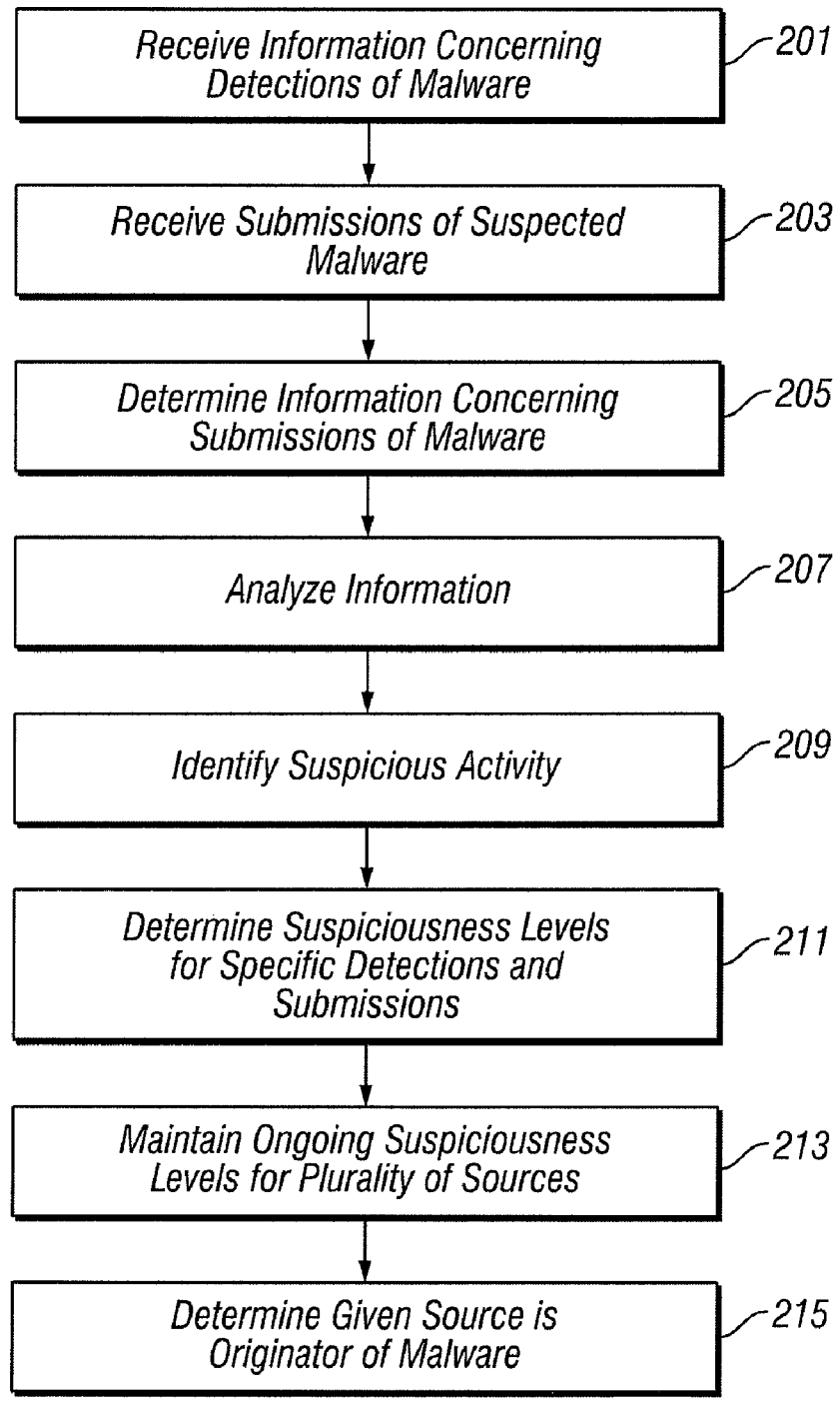
FIG. 2 is a flowchart illustrating steps for identifying an originator of malware, according to one embodiment of the present invention.

FIG. 2 is a flowchart illustrating steps for identifying an originator 101 (FIG. 1) of malware 103 (FIG. 1), according to one embodiment of the present invention. The malware analysis component 111 (FIG. 1) receives 201 information 109 (FIG. 1) concerning detections of malware 101 (FIG. 1) from an anti-malware product 105 (FIG. 1) running on a plurality of user computers 107 (FIG. 1). The malware analysis component 111 (FIG. 1) also receives 203 direct submissions of suspected malware 103 (FIG. 1), and determines 205 corresponding information 110 (FIG. 1) concerning these submissions. The malware analysis component 111 (FIG. 1) analyzes 207 the information 109/110 (FIG. 1) concerning the detections and submissions of malware 103 (FIG. 1), and identifies 209 suspicious malware detection and submission activity. The malware analysis component 111 (FIG. 1) determines 211 suspiciousness levels for specific detections and submissions of malware 103 (FIG. 1), and maintains 213 an ongoing suspiciousness level for each detection/submission source. Responsive to an ongoing suspiciousness level for a given source reaching a threshold, the malware analysis component 111 (FIG. 1) determines 215 that the given source is an originator 101 (FIG. 1) of malware 103 (FIG. 1).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies, data structures and other aspects, of the invention can be implemented as software, hardware, firmware or any combination of the three. Wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable storage media as computer program products. Any form of tangible computer readable storage medium can be used in this context, such as magnetic or optical storage media. As used herein, the term "computer readable storage medium" does not mean an electrical signal separate from an underlying physical medium. Additionally, software portions of the present invention can be instantiated (for example as object code or executable images) within the memory of any computing device. As used herein, the terms "computer," "server" and "computing device" mean one or more computers configured and/or programmed to execute the described functionality.

Accordingly, the disclosure of the present invention is intended to be illustrative, but not limiting, of the scope of the invention, which is set forth in the following claims.

What is claimed is:

1. A computer implemented method for identifying originators of malware, the method comprising the steps of:
    receiving information concerning malware infections proactively submitted from a plurality of sources, by a computer;
    analyzing information concerning malware infections received from the plurality of sources, by a computer;
    identifying malware infection activity at a developmental stage of its life cycle and that is associated with at least one source from the plurality of sources indicative of malware origination by the at least one source, by a computer; and
    responsive to identifying a given threshold of malware infection activity associated with at the least one source indicative of malware origination, determining that the at least one source is an originator of malware, by a computer.

2. The method of claim 1 wherein receiving information concerning malware infections from a plurality of sources further comprises performing at least one step from a group of steps consisting of:
    receiving information concerning at least one detection of malware on at least one source, by a computer;
    receiving information concerning at least one detection of malware on at least one source, and determining additional information concerning the at least one detection from the receipt, by a computer;
    receiving at least one submission of suspected malware from at least one source, by a computer;
    receiving at least one submission of suspected malware from at least one source, and determining additional information concerning the at least one submission from the receipt, by a computer;
    receiving detected malware, by a computer; and
    receiving suspected malware, and determining the suspected malware comprises actual malware, by a computer.

3. The method of claim 1 wherein analyzing information concerning malware infections further comprises performing at least one step from a group of steps consisting of:
    analyzing information concerning at least one detection of malware, by a computer; and
    analyzing information concerning at least one submission of malware, by a computer.

4. The method of claim 1 wherein identifying malware infection activity indicative of malware origination further comprises performing at least one step from a group of steps consisting of:
    identifying detection of new malware, by a computer;
    identifying submission of new malware, by a computer;
    identifying detection of malware early in its life cycle, by a computer;
    identifying submission of malware early in its life cycle, by a computer;
    identifying detection of suspicious malware, by a computer;
    identifying submission of suspicious malware, by a computer;
    identifying multiple detections of new malware on a single source, by a computer;
    identifying multiple submissions of new malware by a single source, by a computer;
    identifying multiple detections, on a single source, of malware early in its life cycle, by a computer;
    identifying multiple submissions, by a single source, of malware early in its life cycle, by a computer;
    identifying multiple detections of suspicious malware on a single source, by a computer;
    identifying multiple submissions of suspicious malware by a single source, by a computer;

identifying detections of multiple instances of malware with different hash values but a single signature on a single source, by a computer; and identifying submissions of multiple instances of malware with different hash values but a single signature by a single source, by a computer.

5. The method of claim 1 further comprising:

determining a suspiciousness level of each receipt of information concerning a malware infection, by a computer.

6. The method of claim 1 further comprising:

maintaining an ongoing suspiciousness level for each source of the plurality, by a computer.

7. The method of claim 1 further comprising, responsive to determining that a source is an originator of malware, performing at least one additional step from a group of steps consisting of:

monitoring activity performed by the source, by a computer;

performing a detailed analysis of all new binary files detected on the source, by a computer;

performing a detailed analysis of all new binary files submitted by the source, by a computer;

flagging all new binary files detected on the source as being malware, by a computer;

flagging all new binary files submitted by the source as being malware, by a computer; and reporting information concerning the source to a remote entity, by a computer.

8. At least one non-transitory computer readable storage medium containing a computer program product for identifying originators of malware, the computer program product comprising:

program code configured to receive information concerning malware infections proactively submitted from a plurality of sources;

program code configured to analyze information concerning malware infections received from the plurality of sources;

program code configured to identify malware infection activity at a developmental stage of its life cycle and that is associated with at least one source from the plurality of sources indicative of malware origination by the at least one source; and program code configured to determine, responsive to identifying a given threshold of malware infection activity associated with at the least one source indicative of malware origination, that the at least one source is an originator of malware.

9. The computer program product of claim 8 wherein the program code configured to receive information concerning malware infections from a plurality of sources further comprises program code configured to perform at least one step from a group of steps consisting of:

receiving information concerning at least one detection of malware on at least one source;

receiving information concerning at least one detection of malware on at least one source, and determining additional information concerning the at least one detection from the receipt;

receiving at least one submission of suspected malware from at least one source;

receiving at least one submission of suspected malware from at least one source, and determining additional information concerning the at least one submission from the receipt;

receiving detected malware; and receiving suspected malware, and determining the suspected malware comprises actual malware.

10. The computer program product of claim 8 wherein the program code configured to analyze information concerning malware infections further comprises program code configured to perform at least one step from a group of steps consisting of:

analyzing information concerning at least one detection of malware; and analyzing information concerning at least one submission of malware.

11. The computer program product of claim 8 wherein the program code configured to identify malware infection activity indicative of malware origination further comprises program code configured to perform at least one step from a group of steps consisting of:

identifying detection of new malware;

identifying submission of new malware;

identifying detection of malware early in its life cycle;

identifying submission of malware early in its life cycle;

identifying detection of suspicious malware;

identifying submission of suspicious malware;

identifying multiple detections of new malware on a single source;

identifying multiple submissions of new malware by a single source;

identifying multiple detections, on a single source, of malware early in its life cycle;

identifying multiple submissions, by a single source, of malware early in its life cycle;

identifying multiple detections of suspicious malware on a single source;

identifying multiple submissions of suspicious malware by a single source;

identifying detections of multiple instances of malware with different hash values but a single signature on a single source; and identifying submissions of multiple instances of malware with different hash values but a single signature by a single source.

12. The computer program product of claim 8 further comprising:

program code configured to determine a suspiciousness level of each receipt of information concerning a malware infection.

13. The computer program product of claim 8 further comprising:

program code configured to maintain an ongoing suspiciousness level for each source of the plurality.

14. The computer program product of claim 8 further comprising program code configured to perform, responsive to determining that a source is an originator of malware, at least one additional step from a group of steps consisting of:

monitoring activity performed by the source;

performing a detailed analysis of all new binary files detected on the source;

performing a detailed analysis of all new binary files submitted by the source;

flagging all new binary files detected on the source as being malware;

flagging all new binary files submitted by the source as being malware; and reporting information concerning the source to a remote entity.

15. A computer system, at least partially implemented in hardware, for identifying originators of malware, the computer system comprising:

a processor;

computer memory;

an interface configured to receive information concerning malware infections proactively submitted from a plurality of sources; and a malware analysis component configured to analyze information concerning malware infections received from the plurality of sources, to identify malware infection activity at a developmental stage of its life cycle and that is associated with at least one source from the plurality of sources indicative of malware origination by the at least one source, and to determine, responsive to identifying a given threshold of malware infection activity associated with the at least one source indicative of malware origination, that the at least one source is an originator of malware.

16. The computer system of claim 15 wherein the interface configured to receive information concerning malware infections from a plurality of sources is further configured to perform at least one step from a group of steps consisting of:

receiving information concerning at least one detection of malware on at least one source;

receiving information concerning at least one detection of malware on at least one source, and determining additional information concerning the at least one detection from the receipt;

receiving at least one submission of suspected malware from at least one source;

receiving at least one submission of suspected malware from at least one source, and determining additional information concerning the at least one submission from the receipt;

receiving detected malware; and receiving suspected malware, and determining the suspected malware comprises actual malware.

17. The computer system of claim 15 wherein the malware analysis component is further configured to perform at least one step from a group of steps consisting of:

analyzing information concerning at least one detection of malware; and analyzing information concerning at least one submission of malware.

18. The computer system of claim 15 wherein the malware analysis component is further configured to perform at least one step from a group of steps consisting of:

identifying detection of new malware;

identifying submission of new malware;

identifying detection of malware early in its life cycle;

identifying submission of malware early in its life cycle;

identifying detection of suspicious malware;

identifying submission of suspicious malware;

identifying multiple detections of new malware on a single source;

identifying multiple submissions of new malware by a single source;

identifying multiple detections, on a single source, of malware early in its life cycle;

identifying multiple submissions, by a single source, of malware early in its life cycle;

identifying multiple detections of suspicious malware on a single source;

identifying multiple submissions of suspicious malware by a single source;

identifying detections of multiple instances of malware with different hash values but a single signature on a single source; and identifying submissions of multiple instances of malware with different hash values but a single signature by a single source.

19. The computer system of claim 15 wherein the malware analysis component is further configured to determine a suspiciousness level of each receipt of information concerning a malware infection.

20. The computer system of claim 15 wherein the malware analysis component is further configured to maintain an ongoing suspiciousness level for each source of the plurality.

* * * * *